(No Model.) 4 Sheets—Sheet 1.

G. W. KING.
FRACTURE APPARATUS.

No. 488,631. Patented Dec. 27, 1892.

Witnesses.
Daniel Robertson
John W Harrison

INVENTOR
George Weirs King
per. Edward C Russell
Attorney.

(No Model.)

G. W. KING.
FRACTURE APPARATUS.

No. 488,631. Patented Dec. 27, 1892.

Witnesses
Daniel Robertson
John W. Harrison

Inventor
George Weir King
per
Edward S. Russel
Attorney.

(No Model.)  4 Sheets—Sheet 3.

G. W. KING.
FRACTURE APPARATUS.

No. 488,631. Patented Dec. 27, 1892.

Witnesses.
Daniel Robertson
John W. Harrison

Inventor
George Wern King
per: Edward C. Russell
Attorney.

(No Model.)  4 Sheets—Sheet 4.

G. W. KING.
FRACTURE APPARATUS.

No. 488,631. Patented Dec. 27, 1892.

Witnesses.
C. S. Hawe
C. Brodersen

Inventor.
George W. King
per
Edward ............
Attorney.

UNITED STATES PATENT OFFICE.

GEORGE WEIRS KING, OF HELENA, MONTANA.

FRACTURE APPARATUS.

SPECIFICATION forming part of Letters Patent No. 488,631, dated December 27, 1892.

Application filed February 23, 1892. Serial No. 422,576. (No model.)

*To all whom it may concern:*

Be it known that I, GEORGE WEIRS KING, a citizen of the United States, and a resident of the city of Helena, county of Lewis and Clarke, State of Montana, have invented a new and useful Improvement in Fracture Apparatus, of which the following is a specification.

In the treatment of fractures there is always difficulty, even with the aid of an assistant, in maintaining the limb in proper position, and much extra pain is occasioned by frequent moving of the injured limb during the application of splints or bandages.

My invention is designed to obviate this difficulty by providing a portable apparatus by means of which the operator, without the aid of an assistant, can apply and maintain proper extension and counter-extension of, and support for, the broken limb, and, at the same time have free access to every part of it for the convenient application of the splints or bandages.

The invention consists essentially of a frame work composed of a horizontal base frame with two attached end uprights or standards—one of which is angularly adjustable—from one to the other of which is drawn a band of canvas or other suitable elastic fabric for the fractured limb to rest upon, and which have suitable devices for securing extension and counter-extension of the limb, all of which will be hereinafter set forth.

Figure 4:
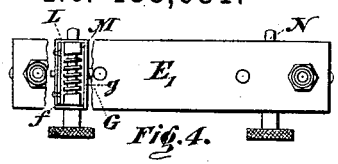
Figure 1:
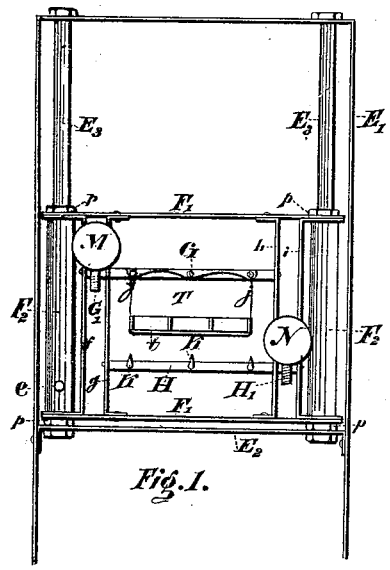
Figure 2:
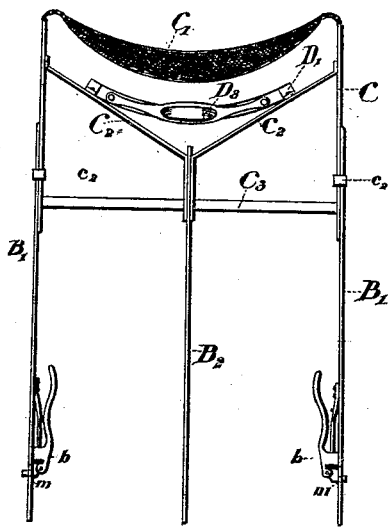
Figure 3:
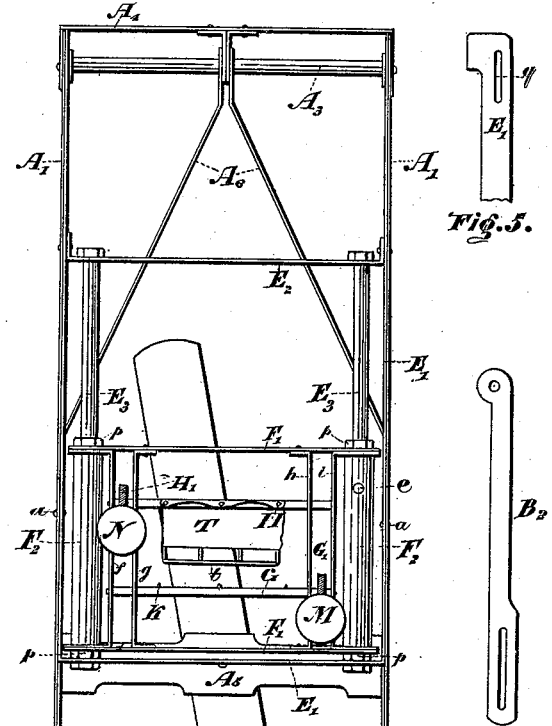
Figure 5:
Figure 6:
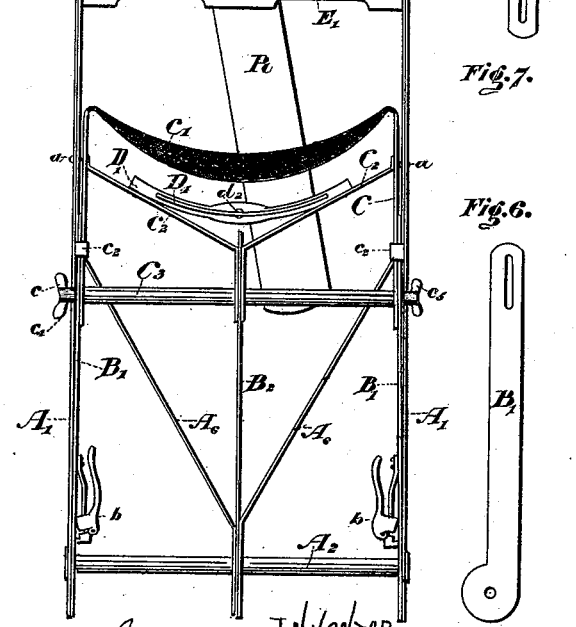
Figure 7:
Figure 8:
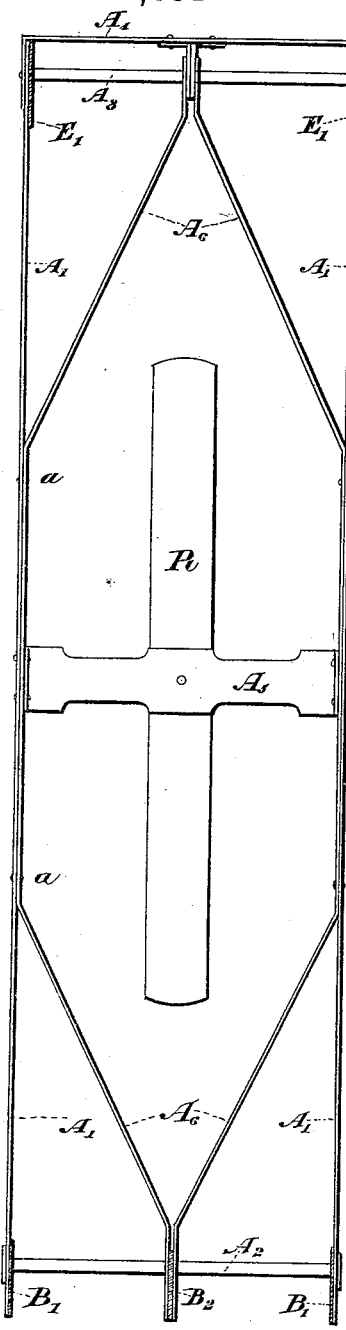
Figure 9:
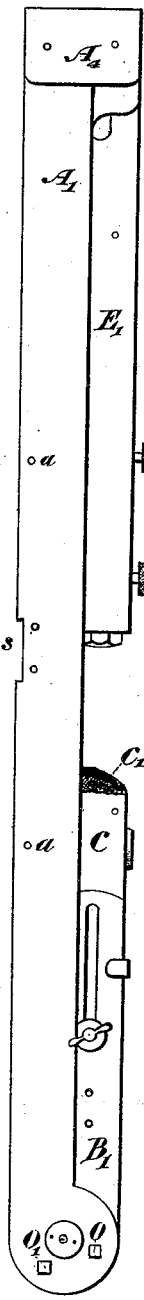
Figure 14:
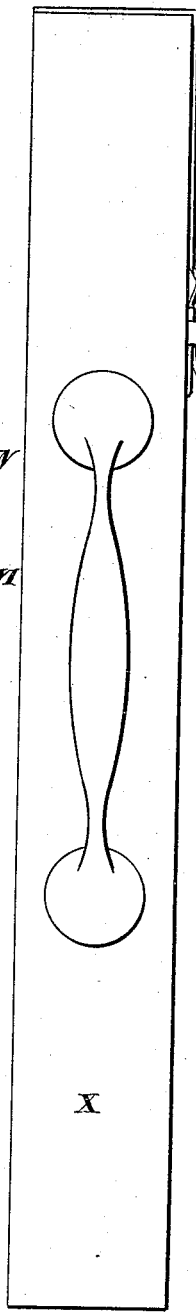
Figure 10:
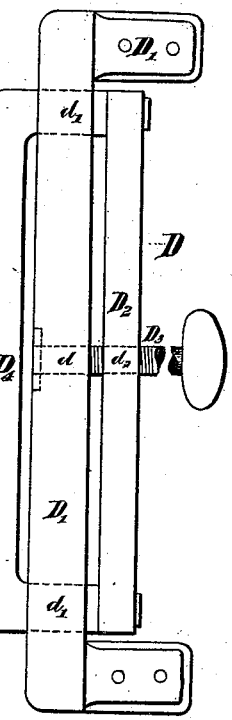
Figure 11:
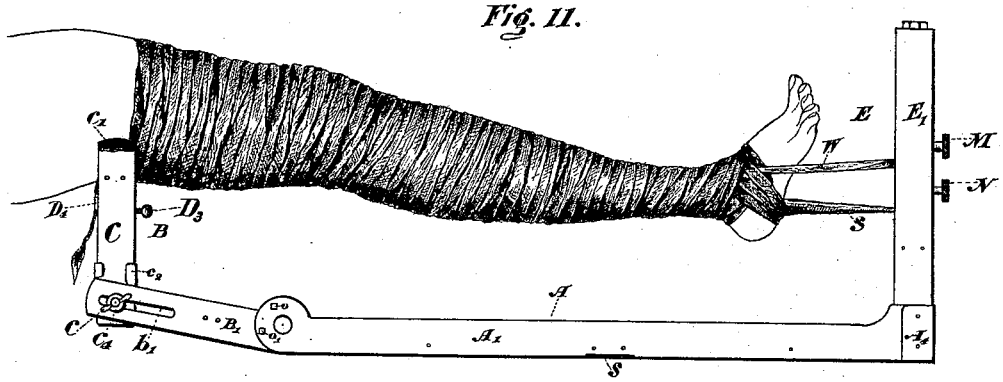
Figure 12:
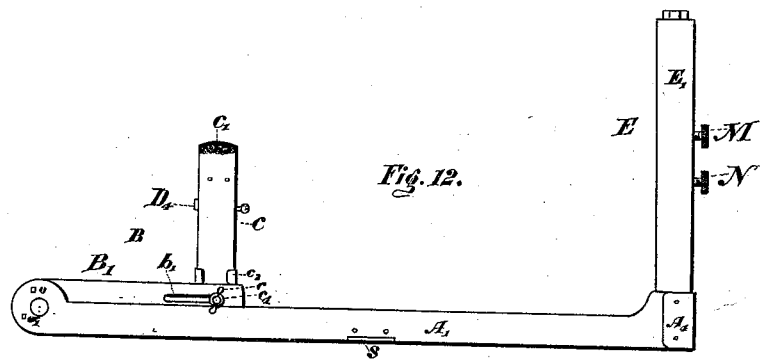
Figure 13:
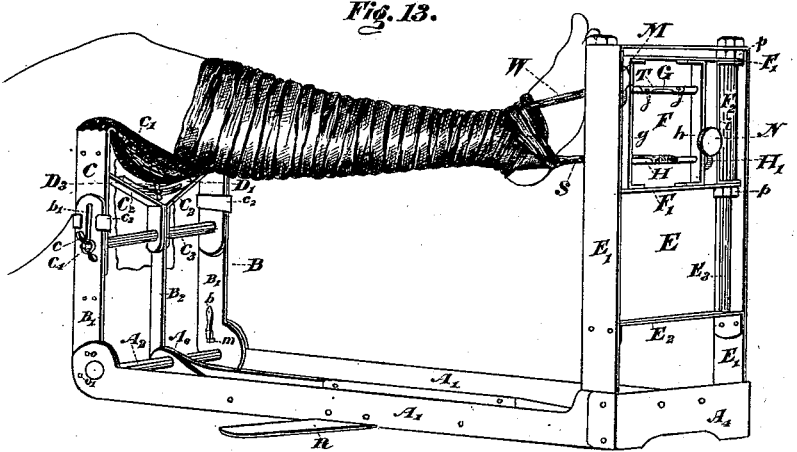
Figure 15:
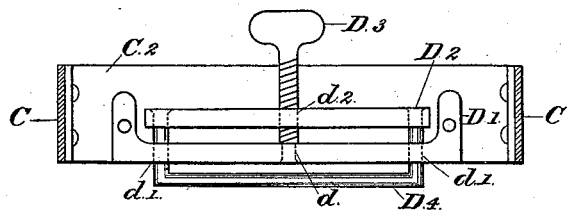
Figure 16:
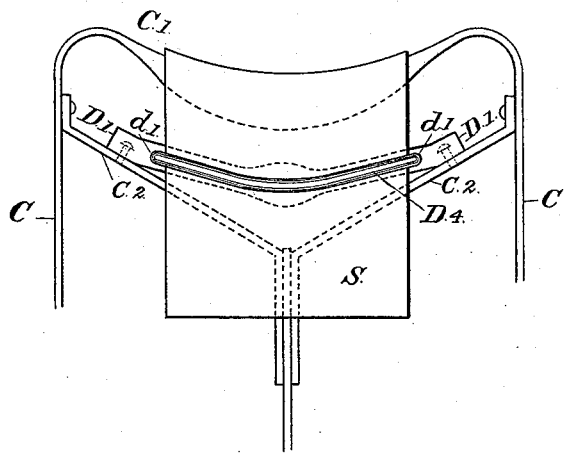

Figure 1 is an end elevation of the foot standard. Fig. 2 is an inside elevation of the head standard. Fig. 3 is a plan of the instrument folded up, for transportation. Fig. 4 is a plan of foot standard, with worm screw, and its frame in section. Fig. 5 shows side elevation of outer frame of foot standard. Fig. 6 shows side elevation of side bar of lower section of head standard. Fig. 7 shows side elevation of center bar of lower section of head standard. Fig. 8 is plan of base frame. Fig. 9 is side elevation of instrument folded up. Fig. 10 is plan of clamp device. Fig. 11 is side elevation of instrument, extended for fracture at or above the knee. Fig. 12 side elevation of instrument shortened to its minimum extension. Fig. 13 perspective view of instrument adjusted for fracture below knee. Fig. 14 is side elevation of case. Fig. 15 is plan of clamp device. Fig. 16 is outside elevation of clamp device, holding webbing.

Similar letters of reference refer to similar parts throughout the drawings.

The base frame A is composed of the two side bars A', connected at each end by the rods $A^2$ and $A^3$, and at the foot end by an end bar or brace $A^4$ and at its center by the cross-bar $A^5$, and is braced inside by the braces $A^6$, which are fastened to the side bars A' at $a$, by rivets, and which have holes in their ends $a'$, through which the end bars $A^2$ and $A^3$ pass.

The head standard B is formed of two sections. The lower section is composed of the side bars B', and center bar $B^2$, working on the rod $A^2$, said side bars B' being disk shaped at lower end, corresponding to the disk-shaped ends of the side bars A'. In each of these disks is a hole, $m$, which corresponds in certain position of the head standard B with like holes, $o$, $o'$, in the disks of the side bars A', and into which play the tongues of the spring pawls $b$, which are riveted on the inside of the side bars B', thus locking the joint. The side bars B' and center bar $B^2$ are slotted in their upper ends at $b'$.

The upper section of the head standard B is made of the main piece C, forming the sides and top,—the top being depressed into a curved rest C', which is upholstered; the braces $C^2$, and the cross rod $C^3$. The cross rod $C^3$ passes through the slots $b'$ in the bars B' and $B^2$, and has a thread cut on one projecting end, on which plays the thumb screw $c$ against the washer $c^4$, the other end having an immovable thumb piece $c^5$. On this rod $C^3$ are two free cylinders $c'$ the ends of which offer shoulders against the sides C and the braces $C^2$, when the thumb screw is tightened.

Riveted on the lower ends of the piece C, about one inch above the cross rod $C^3$, are the clamps or keepers $c^2$ which receive along the outside surfaces of the piece C the upper ends of the side bars B', as shown in Fig. 13, or which act as shoulders, to prevent lateral tipping, as shown in Fig. 11. These keepers are wider toward the base frame, to secure the vertical position of the upper section, as seen in Fig. 11.

Fastened to the upper surfaces of the braces $C^2$ is the clamping device D, composed of the supporting piece D', riveted at each end to the said braces C², the back piece D², having a threaded hole d² at its center, in which plays the threaded thumb screw D³, which passes through the hole d in the piece D', and has a shoulder on each side of this piece D'; and the clamping bar D⁴, the ends of which pass through the holes d' in the piece D' and are riveted into the back piece D².

The foot standard E is composed of one piece E', forming the tops and sides, the cross bar E², and the two rods E³, fixed in the top piece E' and the cross bar E². Upon these rods E³ works, vertically, the sliding frame F, composed of the cross pieces F', the cylinders F² and the uprights f, g, h, and i. Supported in bearings in the uprights f, g and h is the wheel shaft G, carrying the fixed wheel G' between the uprights f and g and furnished with the buttons j. The wheel shaft H, carrying the fixed wheel H' and the hooks K, is supported in bearings in the uprights g, h and i. Riveted to the upright f is the frame L, see Fig. 4, carrying the worm screw M, which works into the wheel G' and turns the shaft G. A similar frame fitted on the upright i, carries the worm screw N, which turns the wheel H', and thus the shaft H. The frame F is held together by the nuts p screwed upon the threaded ends of the cylinders F². A small thumb screw e, in the base of the cylinder F², bears against the rod E³, and is used to hold the frame F in any desired position. The lower ends of the frame piece E are slotted at q, and work, in these slots, on the rod A³.

Pivoted, at its center, to the center of the cross bar A⁵ is the supporting strip R, which is about one foot longer than the cross bar A⁵. The cross bar A⁵ is fixed to the side bars A', just the thickness of the strip R, above their lower edges, and the side bars A' each have a broad notch, s, into which the strip R springs, when swung out at right angles to the base frame.

Buttoned on the wheel shaft G, is a broad strip of leather T carrying the rectangular metal loop t.

Having thus described my invention, its mode of operation is as follows:—Taking it, folded, from the case X, as seen in Figs. 3 and 9, and supposing the case to be treated is a fracture below the knee (see Fig. 13), or of the forearm, the head standard B is brought to a vertical position, in which it is locked by the pawl b at its joint with the base frame A. The upper section is adjusted in a vertical position in line with the lower section, and pressed downward, the cross rod C³, working down in the slots b', and the keepers c² embracing the upper ends of the side bars B'. (This is also the adjustment of these two sections, as to each other, when the head standard is folded down.) Next the foot standard E is raised to a vertical position and being pressed downward, drops, the length of the slots q, into position on the rod A³. The supporting strip R is swung to a position at right angles to the long way of the frame, directly under the cross bar A⁵, and is held in position by the notches s. A piece of strong webbing or other suitable elastic material S, is fastened at one end to the hooks K on the shaft H; the other end is carried to the head standard B, and is passed over the upholstered rest C' and between the clamp D⁴ and the piece D', where it is tightly held by turning the thumb screw D³, until the clamp D⁴ presses it against the supporting piece D'. The sliding frame F is then adjusted perpendicularly so that the webbing will be level. The worm screw N is then turned, until the webbing is stretched to the desired tension. In fractures of the leg, a slit is cut in the webbing to receive the heel of the patient. The instrument is then placed so that the knee joint rests upon the rest C', and the fractured limb upon the webbing. A clove-hitch is taken around the ankle with a strip of strong cloth W, the free ends being tied to the metal loop t. The worm screw M is then turned until the fractured limb is extended to the desired length, the brace or rest C', by its pressure against the leg above the knee, providing the necessary counter-extension. The bandages are then applied, inclosing with the limb, the webbing S. In fractures of the arm, the rest C', is placed in the arm-pit to secure the necessary counter-extension. If the fracture is above the knee (see Fig. 11), or for any reason a longer distance is desired between the tension shaft G and the counter-extension brace or rest C', the head standard B is adjusted by pressing the handles of the pawls b and withdrawing the ratchet tongues from the holes o, in the disks of the side bars A, and then tilting the standard outward, till the pawl tongues catch in the next set of holes o'. The upper section of the head standard is drawn out until the side bars B', are free from the keepers c²; it is then brought to a vertical position, and moved toward the base frame, the rod C³ sliding in the slots b' and the keepers c² forming a shoulder against the upper edge of the bars B'. The distance between the standards can be further regulated, to extent of the length of the slots b', and the desired position secured by tightening the thumb screw c. The webbing S is arranged, and the sliding frame F adjusted to the altered height of the rest C'. The injured limb is placed upon the supporting band and the extension applied to the foot as above described, and in case of a leg, counter-extension is secured by the resistance of the brace C', against the upper part of the thigh of the patient.

The advantages of the instrument are especially marked in using plaster bandages; a piece of clean wadding being first laid upon the webbing, is folded about the fractured limb, and the inclosing of the webbing within the bandages materially strengthens the splint.

The instrument is preferably made of aluminum or nickel plated steel, is very convenient and portable, being readily placed, and easily carried in a canvas or leather case, Fig. 14.

Having thus described my invention, I claim as new and desire to secure by Letters Patent;

1. An apparatus for the treatment of fractures containing a horizontal base frame; two adjustable standards attached to the ends of said frame; a broad band stretched from one to the other standard; devices for adjusting said band; devices for applying extension and counter-extension to the fractured limb, and devices for holding the standards in adjusted position; all arranged and operated substantially as herein shown and described.

2. In an apparatus designed for the treatment of fractures, the combination with a base frame and two opposite uprights or standards fixed at the ends of the base frame of a band adapted to support the fractured limb, and stretched adjustably between said standards, substantially as herein shown and described.

3. In an apparatus for treating fractures the combination of a base frame with two upright adjustable standards fixed at the ends of the base frame, one provided with a mechanical device for securing extension of the fractured limb, and the other offering a firm brace or rest for the limb above the fracture to secure counter-extension and being adjustable at any angle from the perpendicular, substantially as herein shown.

4. In an apparatus for treating fractures, the combination of a band, stretched adjustably between two end standards, supporting the fractured limb in mid-air, with a mechanical device for securing extension of the limb and a firm brace or rest for the limb above the fracture to secure counter-extension, substantially as herein shown.

5. In an apparatus for treating fractures, the combination with a base board or base frame, of end standards, one of which is adjustable at any angle from the perpendicular, as and for the purpose herein described.

6. In an apparatus for treating fractures, the combination, with a base frame, of a standard, having an adjustable sliding frame, carrying two wheel shafts, operated by worm screws, substantially as, and for the purpose, described.

7. In an apparatus for treating fractures, the combination with a base frame, of an end standard, adapted to use as a brace and rest, jointed to the base frame, and jointed in the middle so as to be adjustable at any angle from the perpendicular, substantially as shown and described.

In testimony that I claim the foregoing as my invention I have signed my name, in presence of two witnesses, this 13th day of February, 1892.

GEORGE WEIRS KING.

Witnesses:
A. J. STEELE,
HENRY W. FOOTE.